United States Patent
Fujiki (10) Patent No.: US 10,638,001 B2
(45) Date of Patent: Apr. 28, 2020

(54) INFORMATION PROCESSING APPARATUS FOR PERFORMING OPTICAL CHARACTER RECOGNITION (OCR) PROCESSING ON IMAGE DATA AND CONVERTING IMAGE DATA TO DOCUMENT DATA

(71) Applicant: KYOCERA Document Solutions Inc., Osaka (JP)

(72) Inventor: Atsushi Fujiki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/288,767

(22) Filed: Feb. 28, 2019

(65) Prior Publication Data
US 2019/0268487 A1    Aug. 29, 2019

(30) Foreign Application Priority Data
Feb. 28, 2018   (JP) ................... 2018-034228

(51) Int. Cl.
*H04N 1/00* (2006.01)
*H04N 1/32* (2006.01)

(52) U.S. Cl.
CPC ..... *H04N 1/00331* (2013.01); *H04N 1/32112* (2013.01)

(58) Field of Classification Search
CPC ................. H04N 1/00331; H04N 1/32112
USPC ....................................... 358/1.15
See application file for complete search history.

(56) References Cited

U.S. PATENT DOCUMENTS

2007/0067713 A1* 3/2007 Ming ............ G06F 40/194
715/235
2015/0146259 A1* 5/2015 Enomoto ......... H04N 1/32112
358/1.16

FOREIGN PATENT DOCUMENTS

JP    2005-114951 A    4/2005

* cited by examiner

*Primary Examiner* — Saeid Ebrahimi Dehkordy
(74) *Attorney, Agent, or Firm* — Hawaii Patent Services; Nathaniel K. Fedde; Kenton N. Fedde (57) ABSTRACT

An information processing apparatus includes a specific pattern storage unit, a pattern comparing unit, a character recognizing unit, and a file generating unit. The specific pattern storage unit stores specific pattern information in which a specific pattern is registered. The pattern comparing unit compares the image data with a specific pattern that is registered in the specific pattern information by image matching and determines whether or not the specific pattern present in the image data is detected, and when detected, deletes the specific pattern from the image data and outputs pattern-deleted image data. The character recognizing unit performs an OCR process on the pattern-deleted image data, converts a character string in the pattern-deleted image data into text data, and outputs the converted text data as an OCR analysis result. The file generating unit generates document data based on the OCR analysis result.

6 Claims, 9 Drawing Sheets

| SPECIFIC PATTERN | COMPARISON AREA | DATA TYPE | CONVERSION DATA |
|---|---|---|---|
| ⊬∠ A-Zshop | (hatched + blank box) | IMAGE | ⊬∠ A-Zshop |
| | | TEXT | A-Zshop |
| | | IMAGE + TEXT | ⊬∠ A-Zshop |

IMAGE → (icon)  
TEXT → (A-Zshop text)

OCR ANALYSIS RESULT

CONVERSION DATA (TEXT)

A-Zshop

INFORMATION PROCESSING APPARATUS FOR PERFORMING OPTICAL CHARACTER RECOGNITION (OCR) PROCESSING ON IMAGE DATA AND CONVERTING IMAGE DATA TO DOCUMENT DATA

INCORPORATION BY REFERENCE

This application is based on and claims the benefit of priority from Japanese Patent Application No. 2018-034228 filed on Feb. 28, 2018, the contents of which are hereby incorporated by reference.

BACKGROUND

The present disclosure relates to an information processing apparatus that performs optical character recognition (OCR) processing on image data and converts the image data to document data.

In recent years, image forming apparatuses such as copying machines, multifunction peripherals (MFPs) and the like have been advancing and are becoming highly functionalized. Therefore, image forming apparatuses have a function for performing an OCR process on read image data and converting that image data into document data in a file format such as "Word" or "Excel" by Microsoft Corporation, Portable Document Format (PDF) or the like.

SUMMARY

The information processing apparatus according to the present disclosure is an information processing apparatus that performs an OCR process on image data and converts the image data into document data. The information processing apparatus includes a specific pattern storage unit, a pattern comparing unit, a character recognizing unit and a file generating unit. The specific pattern storage unit stores specific pattern information in which a specific pattern is registered. The pattern comparing unit compares the image data with a specific pattern that is registered in the specific pattern information by image matching and determines whether or not the specific pattern present in the image data is detected, and in the case where the specific pattern is detected in the image data, deletes the specific pattern from the image data and outputs pattern-deleted image data. The character recognizing unit performs an OCR process on the pattern-deleted image data, converts a character string in the pattern-deleted image data into text data, and outputs the converted text data as an OCR analysis result. The file generating unit generates the document data based on the OCR analysis result.

DETAILED DESCRIPTION

Embodiments according to the present disclosure will be described in detail below with reference to the drawings.

The information processing apparatus 1 of the present embodiment is an image forming apparatus such as a copying machine, a multifunction peripheral (MFP), or the like. In reference to FIG. 1, the information processing apparatus 1 is connected to a control unit 10, an operation unit 20, a document reading unit 30, a storage unit 40, and a printing unit 50 via a system bus 60.

Figure 1:
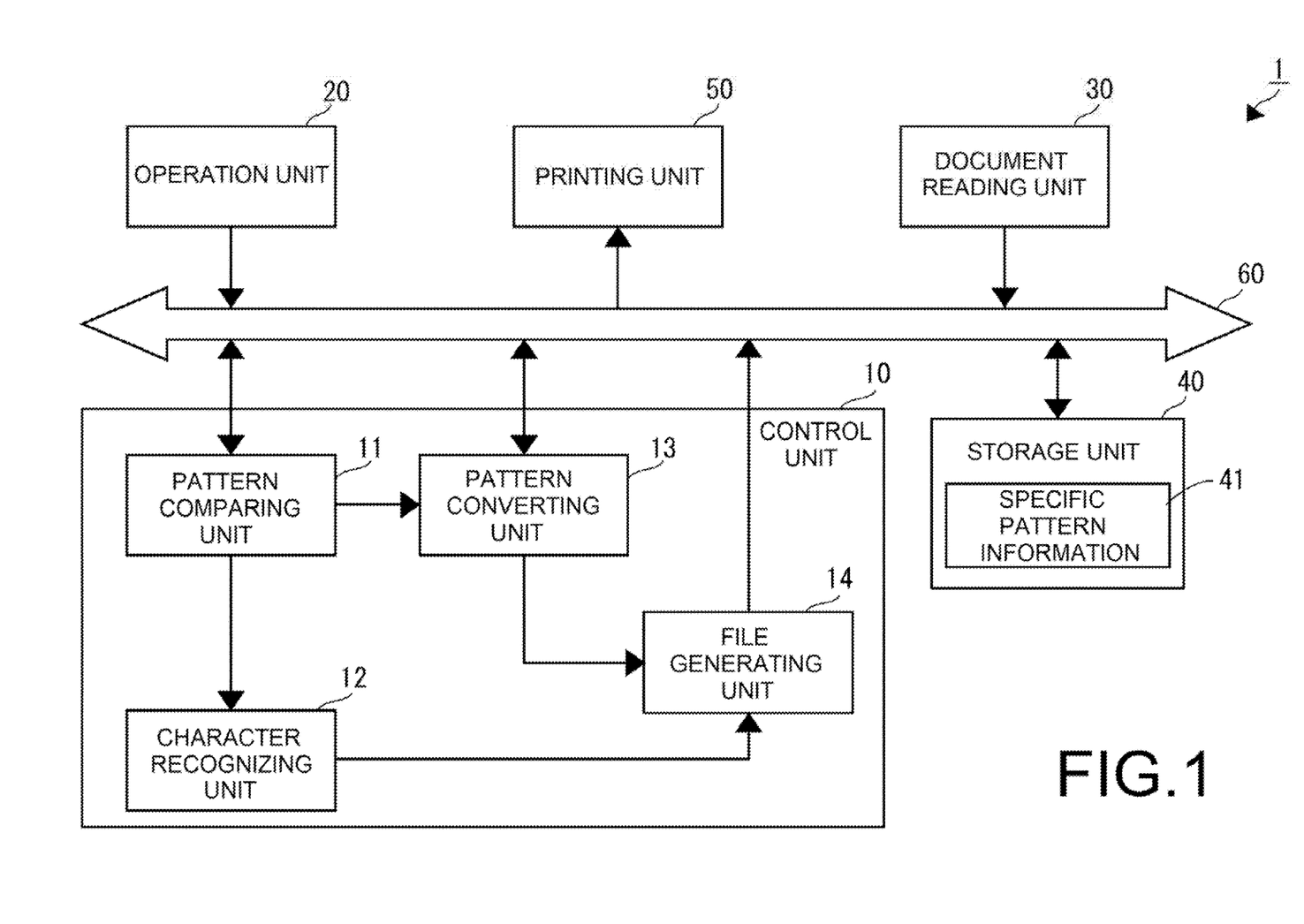
FIG. 1 is a block diagram illustrating a configuration of an information processing apparatus of an embodiment according to the present disclosure.

The operation unit 20 is an input unit such as a keyboard and the like, and is used to perform various instruction input related to a document reading operation by the document reading unit 30, various instruction input related to a printing operation by the printing unit 50, and the like.

The document reading unit 30 is a scanner device that scans a document and acquires image data. The image data acquired by the document reading unit 30 is converted into document data by the control unit 10 and stored in the storage unit 40. Incidentally, the means for acquiring the image data is not limited to the above-mentioned means, and may be means for acquiring image data via an interface unit capable of connecting to a network such as the Internet or the like, and may be means for acquiring image data from various recording media such as flash memory, DVD, and the like.

The storage unit 40 is a storage unit such as a semiconductor memory, Hard Disk Drive (HDD), or the like, and together with storing document data generated by the control unit 10, stores various kinds of management information. In addition, in the storage unit 40, specific pattern information 41 is stored.

Figure 2:
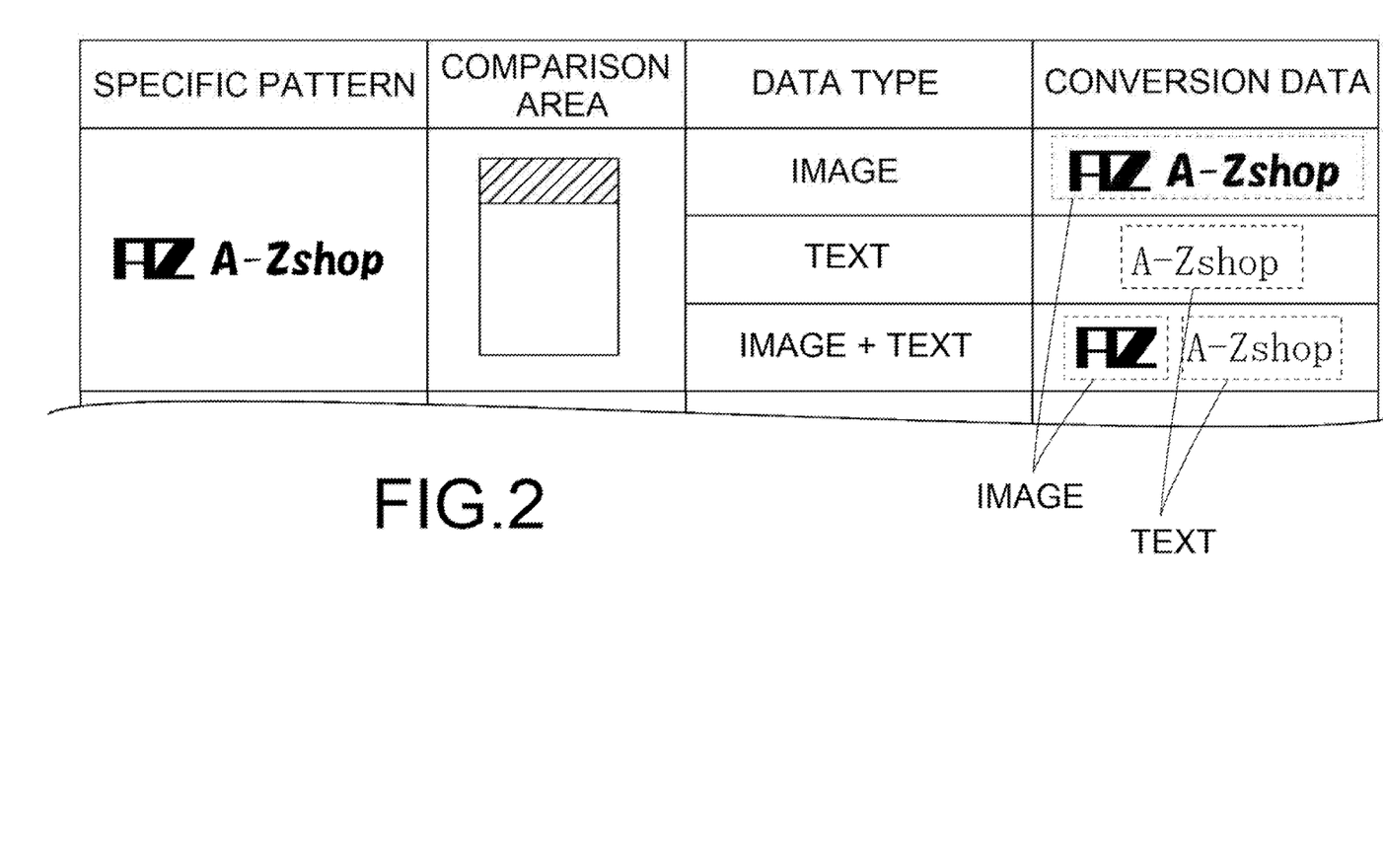
FIG. 2 is a diagram illustrating an example of specific pattern information illustrated in FIG. 1.

As illustrated in FIG. 2, the specific pattern information 41 is information in which a specific pattern (image) such as a company logo or the like and conversion data for converting a specific pattern at the time of an OCR process are correlated. In the specific pattern information 41 of the present embodiment, three conversion data having different data types are correlated and stored for one specific pattern. More specifically, conversion data that includes only text, conversion data that includes only images, and conversion data that includes images+text are correlated and stored.

Moreover, in the specific pattern information 41, an image data area to be compared with a specific pattern is registered as a comparison area. In the specific pattern information 41 illustrated in FIG. 2, the upper area of the image data indicated by slanted lines is registered as a comparison area.

Incidentally, in the specific pattern information 41 illustrated in FIG. 2, the specific pattern and the conversion data that includes only of image data are made to be the same, however they may be different. For example, the specific pattern may be taken to be an old logo, and conversion data that includes only image data may be taken to be a new logo.

The printing unit 50 is an output unit such as a printer or the like that forms an image of the image data on recording paper and outputs the recording paper.

The control unit 10 is an information processing unit such as a microcomputer or the like including a Central Processing Unit (CPU), a Read Only Memory (ROM), a Random Access Memory (RAM), and the like. The ROM stores a control program for controlling the operation of the information processing apparatus 1. Then, the CPU of the control unit 10 reads the control program stored in the ROM and develops the control program in the RAM, thereby controlling the overall operation of the information processing apparatus 1.

The functional blocks of the control unit 10 include a pattern comparing unit 11, a character recognizing unit 12, a pattern converting unit 13, and a file generating unit 14.

The pattern comparing unit 11 compares the image data for which an OCR process is instructed, and the specific pattern registered in the specific pattern information 41 by image matching and determines whether or not a specific pattern present in the image data is detected.

Then, in the case where the specific pattern is detected in the image data, the pattern comparing unit 11 outputs the image data from which the specific pattern has been deleted (hereinafter referred to as pattern-deleted image data) to the character recognizing unit 12. At the same time, the pattern converting unit 13 is notified of the detected specific pattern, pattern position information indicating the position in the image data of the detected specific pattern, and pattern size information indicating the size of the detected specific pattern. Incidentally, in the case where a specific pattern is not detected in the image data, the pattern comparing unit 11 outputs the image data for which an OCR process is instructed (hereinafter referred to as original image data) to the character recognizing unit 12. At the same time, the pattern comparing unit 11 notifies the pattern converting unit 13 of no-detection information indicating that a specific pattern has not been detected.

Note that when comparing the image data with the specific pattern, the pattern comparing unit 11 limits the area of the image data to be compared with the specific pattern to the comparison area registered in the specific pattern information 41, and determines whether or not a specific pattern that is present within the comparison area is detected.

The character recognizing unit 12 performs an OCR process on the image data outputted from the pattern comparing unit 11, converts character strings in the image data into text data, and outputs the converted text data as an OCR analysis result into the file generating unit 14. Therefore, in the case where a specific pattern is detected in the image data, the character recognizing unit 12 performs an OCR process on the pattern-deleted image data.

In addition, the character recognizing unit 12 analyzes the image data and performs layout analysis for distinguishing the character area from the image area. Then, the character recognizing unit 12 performs an OCR process on the character area, and outputs the image area as is. As a result, in the case where the character area and the image area are mixed in the image data, the OCR analysis result that is outputted from the character recognizing unit 12 is that the text and the image are mixed.

In the case where a specific pattern is detected in the image data, the pattern converting unit 13 converts the specific pattern into conversion data registered in the specific pattern information 41 based on the specific pattern and conversion instruction information. The specific pattern is notified from the pattern comparing unit 11. The conversion instruction information is set by input from the operation unit 20 or the like. Incidentally, conversion designation information is information for designating any one of "no conversion", "only text", "image only", "image+text". When the conversion designation information is set to any one of "text only", "image only", and "image+text", the pattern converting unit 13 converts the specific pattern into conversion data of the corresponding data type. Then, the pattern comparing unit 11 outputs the converted conversion data together with the pattern position information and the pattern size information notified from the pattern comparing unit 11 to the file generating unit 14.

In addition, in the case where the specific pattern is not detected in the image data and no-detection information is notified from the pattern comparing unit 11, and in the case where the conversion designation information is set to "no conversion", the pattern converting unit 13 outputs no-conversion information indicating that there is no conversion data to the file generating unit 14.

The file generating unit 14 generates document data that combines the OCR analysis result outputted from the character recognizing unit 12 and the conversion data outputted from the pattern converting unit 13. The file generating unit 14 converts the conversion data outputted from the pattern converting unit 13 into a size based on the pattern size information, and arranges the converted conversion data at a position based on the pattern position information.

In addition, in the case where no-conversion information is outputted from the pattern converting unit 13, the file generating unit 14 generates document data based on the OCR analysis result outputted from the character recognizing unit 12.

Next, the OCR processing operation in the present embodiment will be described in detail with reference to FIG. 3 to FIG. 5B.

Figure 3:
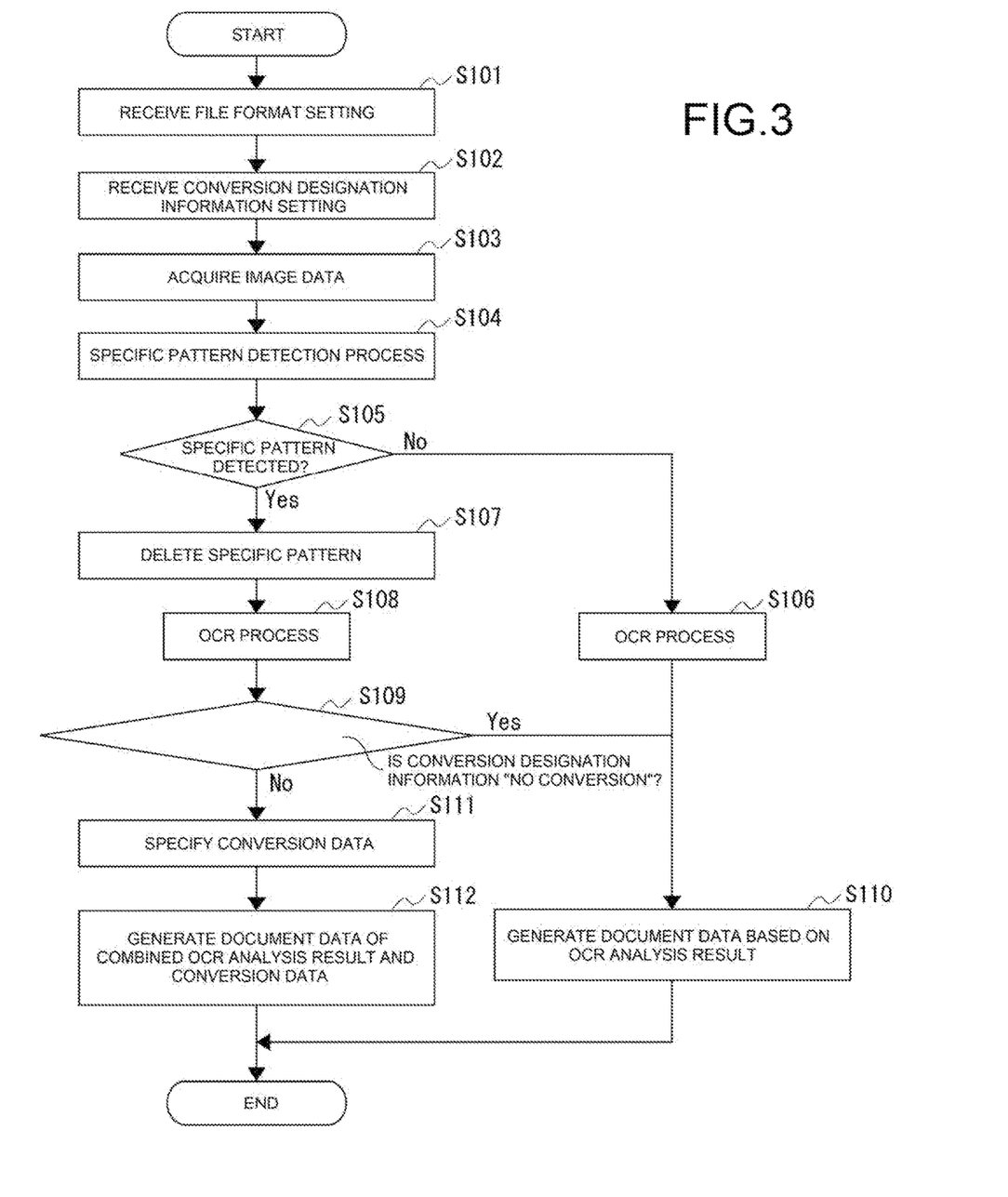
FIG. 3 is a flowchart for explaining the OCR processing operation by the information processing apparatus illustrated in FIG. 1.

Referring to FIG. 3, the control unit 10 receives a setting of the file format of document data generated by an OCR process (step S101), and receives a setting of the conversion designation information (step S102). Incidentally, the settings of the file format and conversion designation information may be received each time by the operation unit 20 at the time of the OCR process, or may be set in advance by default.

Next, upon receiving an instruction for an OCR process by the operation unit 20, the control unit 10 acquires the image data for which the OCR process is instructed from the document reading unit 30 or the like (step S103).

Upon acquiring the image data for which the OCR process is instructed, the control unit 10 functions as the pattern comparing unit 11. The pattern comparing unit 11 compares the image data for which the OCR process is instructed with the specific pattern registered in the specific pattern information 41 by image matching, and executes a specific pattern detection process for detecting a specific pattern present in the image data (step S104).

Next, the pattern comparing unit 11 determines whether or not a specific pattern registered in the specific pattern information 41 is detected in the comparison area of the image data (step S105).

When there is no specific pattern in step S105, the pattern comparing unit 11 outputs the original image data to the character recognizing unit 12. At the same time, the pattern comparing unit 11 notifies the pattern converting unit 13 with no-detection information indicating that a specific pattern has not been detected. Then, the character recognizing unit 12 performs an OCR process on the original image data outputted from the pattern comparing unit 11, and converts the character string in the original image data into text data (step S106). Then, the converted text data is outputted to the file generating unit 14 as an OCR analysis result.

In the case where a specific pattern is detected in step S105, the pattern comparing unit 11 outputs pattern-deleted image data to the character recognizing unit 12 (step S107). At the same time, the pattern comparing unit 11 notifies the pattern converting unit 13 of the detected specific pattern, the pattern position information indicating the position in the image data of the detected specific pattern, and the pattern size information indicating the size of the detected specific pattern. Then, the character recognizing unit 12 performs an OCR process on the pattern-deleted image data outputted from the pattern comparing unit 11, and converts the character string in the pattern-deleted image data into text data (step S108). Then, the converted text data is outputted to the file generating unit 14 as an OCR analysis result.

Next, the pattern converting unit 13 determines whether or not the conversion designation information is set to "no conversion" (step S109).

In the case where the conversion designation information is set to "no conversion" in step S109 and in the case where the specific pattern is not detected in step S105 and there is a notification of no-detection information from the pattern comparing unit 11, the pattern converting unit 13 outputs no-conversion information to the file generating unit 14. Then, when the no-conversion information is outputted from the pattern converting unit 13, the file generating unit 14 generates document data based on the OCR analysis result outputted from the character recognizing unit 12 (step S110), and terminates the OCR processing operation.

When the conversion designation information is set to any one of "text only", "only image", "image+text", instead of "no conversion" in step S110, the pattern converting unit 13 converts into conversion data of the data type in which the conversion designation information corresponds (step S111). Then, the pattern comparing unit 11 outputs the specified conversion data to the file generating unit 14 together with the pattern position information and the pattern size information notified from the pattern comparing unit 11.

Next, the file generating unit 14 generates document data in which the OCR analysis result outputted from the character recognizing unit 12 and the conversion data outputted from the pattern converting unit 13 are combined (step S112), and terminates the OCR processing operation.

Figure 4A:
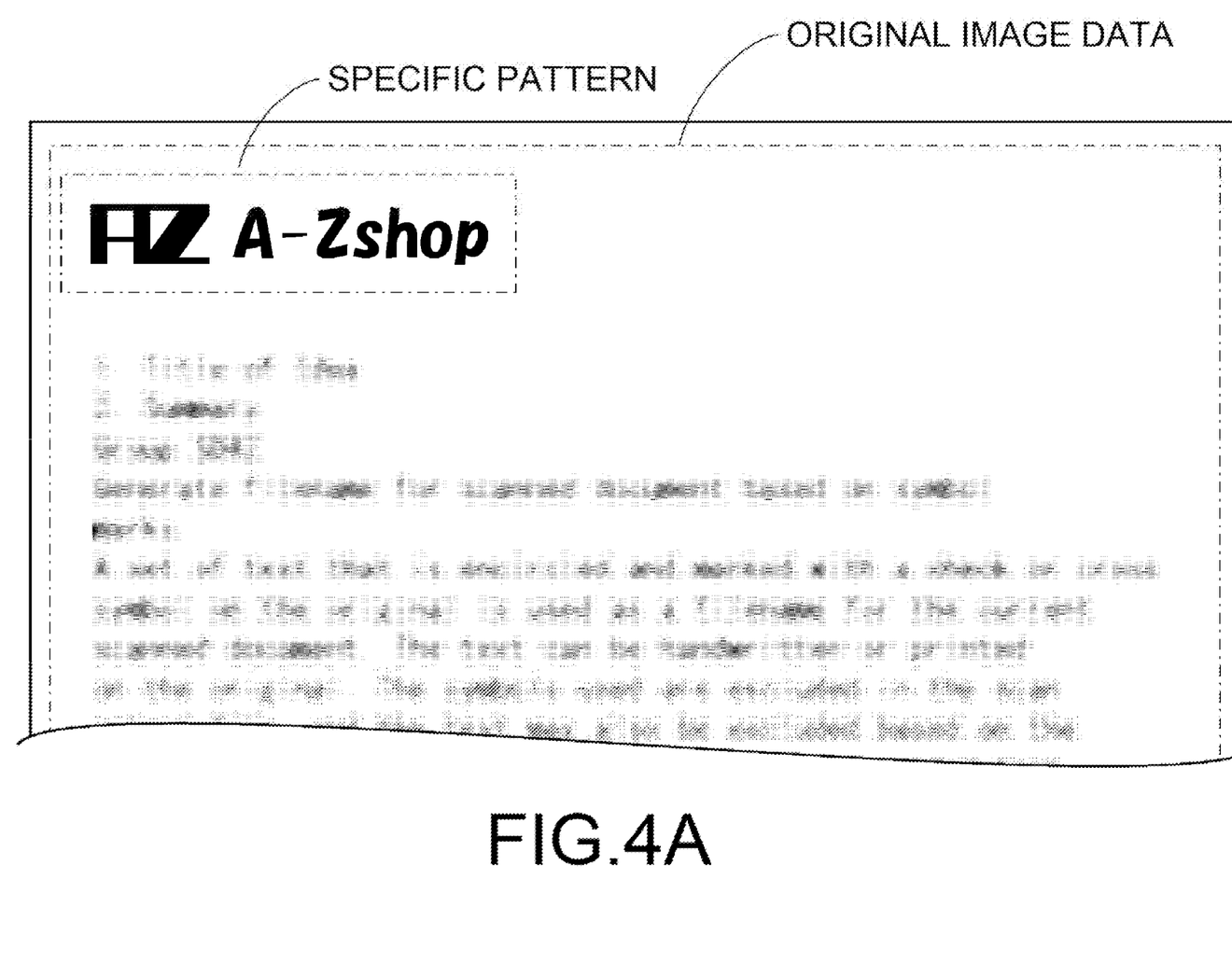
FIG. 4A is a diagram illustrating an example of image data that is a target of the OCR process by the information processing apparatus illustrated in FIG. 1.

As illustrated in FIG. 4A, in the case where a specific pattern registered in the specific pattern information 41 is arranged in the comparison area of the image data (original image data) acquired in step S103, the specific pattern is detected in step S104.

Figure 4B:
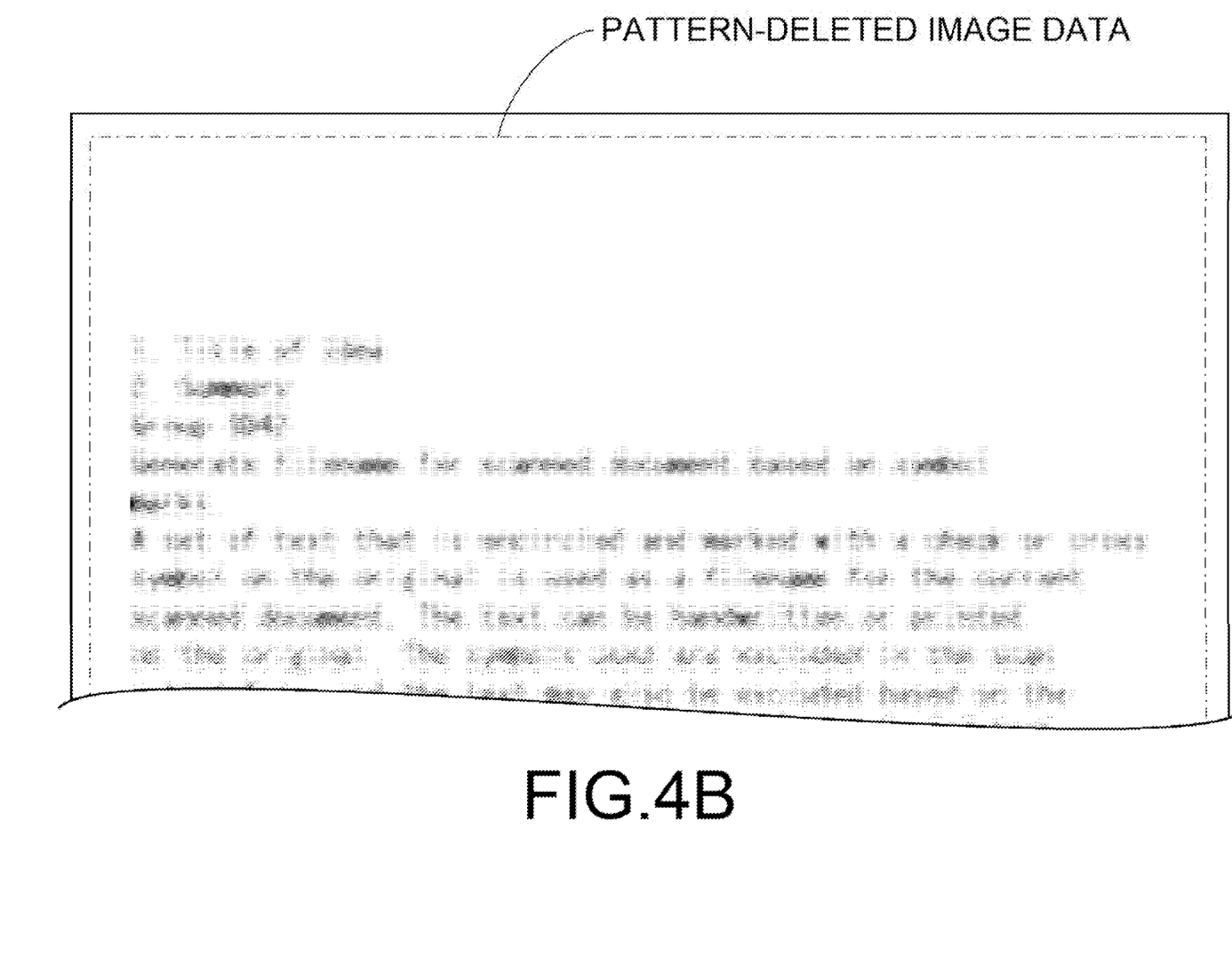
FIG. 4B is a diagram illustrating an example of image data that is a target of the OCR process by the information processing apparatus illustrated in FIG. 1.

Then, as illustrated in FIG. 4B, the pattern comparing unit 11 outputs the pattern-deleted image data, which is deleted the specific pattern detected in step S104 from the image data acquired in step S103, to the character recognizing unit 12 in step S107. Then, the character recognizing unit 12 performs an OCR process on the pattern-deleted image data outputted from the pattern comparing unit 11. Next, as illustrated in FIG. 5A, the character strings in the pattern-deleted image data are converted into text data, and the converted text data is outputted to the file generating unit 14 as an OCR analysis result.

Figure 5A:
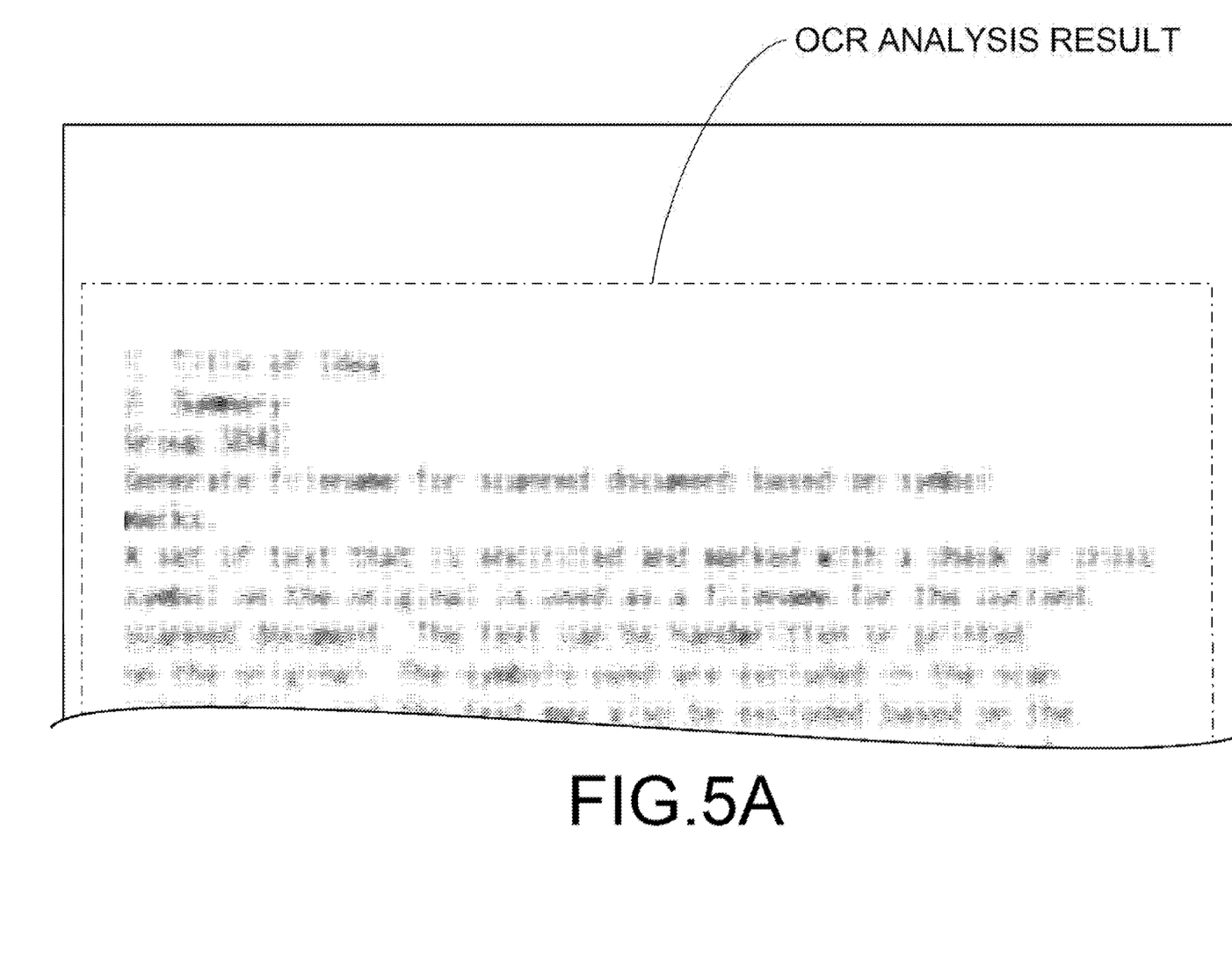
FIG. 5A is a diagram illustrating an example of document data generated by the file generating unit illustrated in FIG. 1.

When the conversion designation information is set to "no conversion", the file generating unit 14 generates document data based on the OCR analysis result illustrated in FIG. 5A outputted from the character recognizing unit 12. In this case, the location where the specific pattern is arranged is a blank space and the specific pattern is not included in the image data for which the OCR process is executed, so erroneous detection of a character string of a special shape such as a logo or the like of a company registered as a specific pattern can be eliminated, and the accuracy of the OCR analysis result can be improved.

Figure 5B:
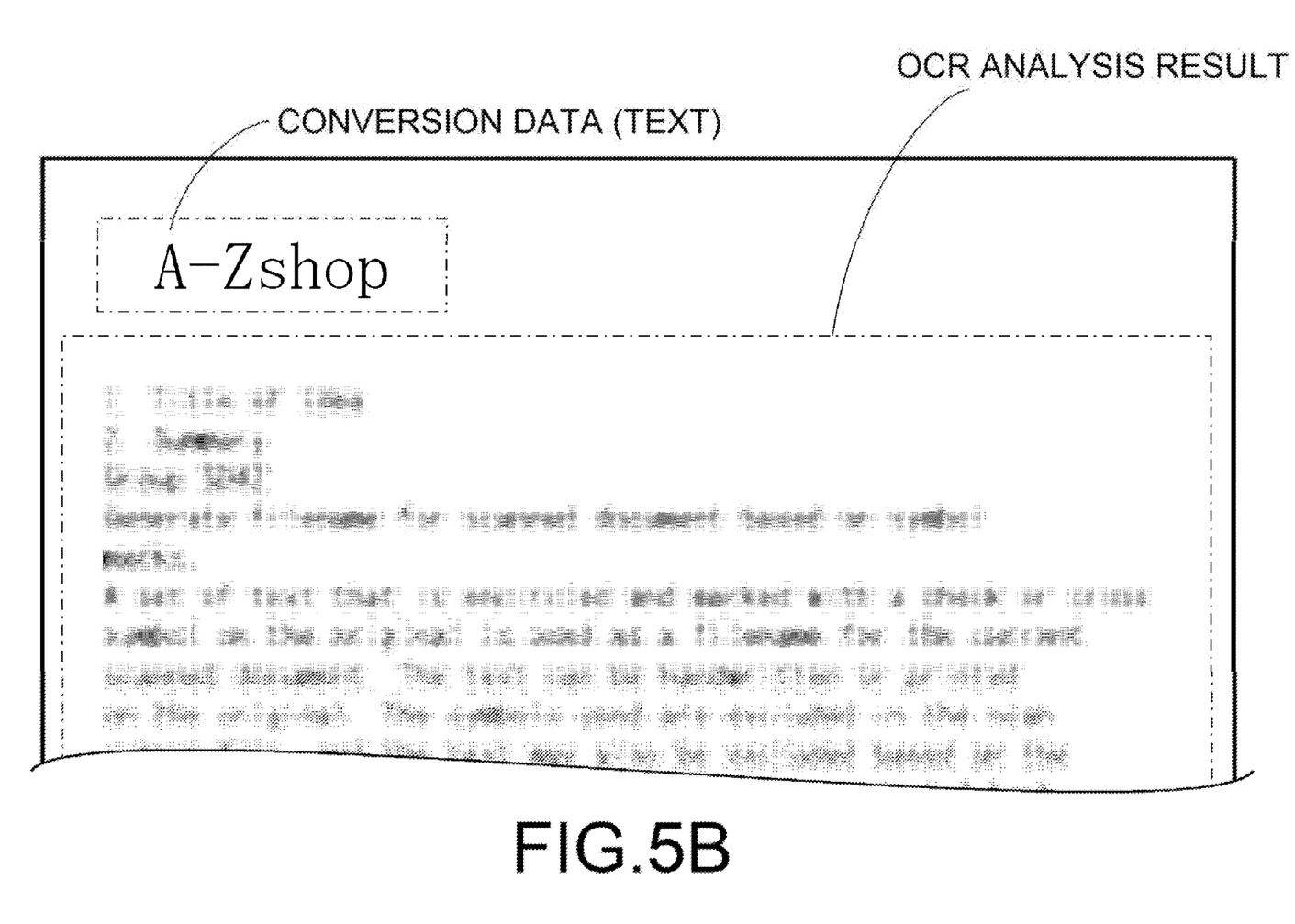
FIG. 5B is a diagram illustrating an example of document data generated by the file generating unit illustrated in FIG. 1.

In the case where the conversion designation information is set to "text only", conversion data, the data type of which is "text only", is specified in step S111. Then, as illustrated in FIG. 5B, the file generating unit 14 generates document data in which the OCR analysis result outputted from the character recognizing unit 12 and the conversion data with the data type "text only" are combined. In this case, the specific pattern is not included in the image data on which the OCR process is executed, so it is possible to eliminate erroneous detection of a character string of a special shape such as a logo or the like of a company registered as a specific pattern, and it is possible to improve the accuracy of the OCR analysis result. At the same time, it is possible to convert a specific pattern into correct text, and a search using the specific pattern can be easily performed.

Figure 6A:
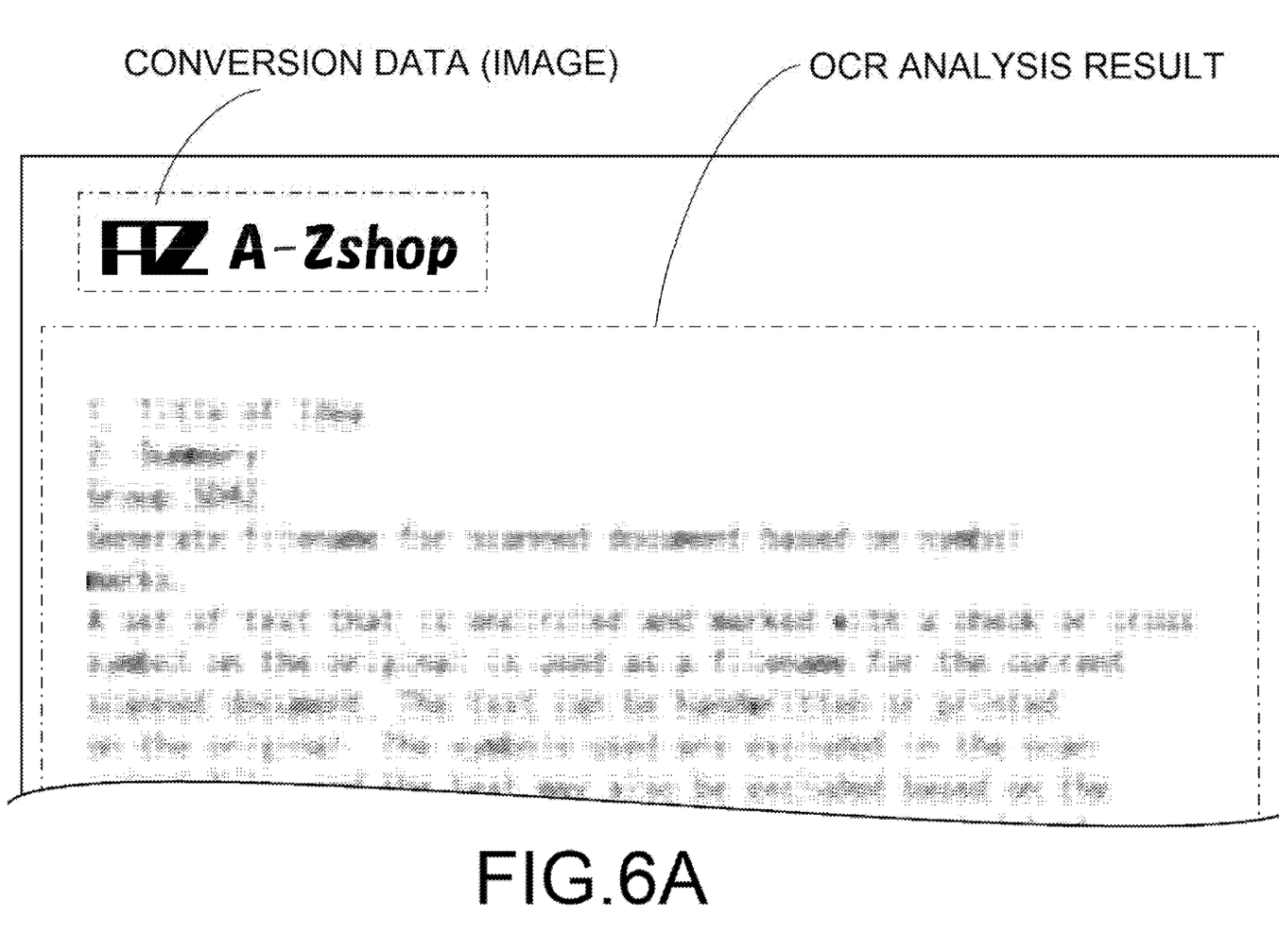
FIG. 6A is a diagram illustrating an example of document data generated by the file generating unit illustrated in FIG. 1.

In the case where the conversion designation information is set to "image only", the conversion data, the data type of which is "image only", is specified in step S111. Then, as illustrated in FIG. 6A, the file generating unit 14 generates document data in which the OCR analysis result outputted from the character recognizing unit 12 and the conversion data having the data type "only image" are combined. In this case, the specific pattern is not included in the image data on which the OCR process is executed, so it is possible to eliminate erroneous detection of a character string of a special shape such as a logo or the like of a company registered as a specific pattern, and it is possible to improve the accuracy of the OCR analysis result. At the same time, since the specific pattern is combined as an image, the appearance is also improved. In addition, by converting the specific pattern as an old logo and taking the conversion data that includes only image data as a new logo, it is possible to easily convert the logo to the new logo.

Figure 6B:
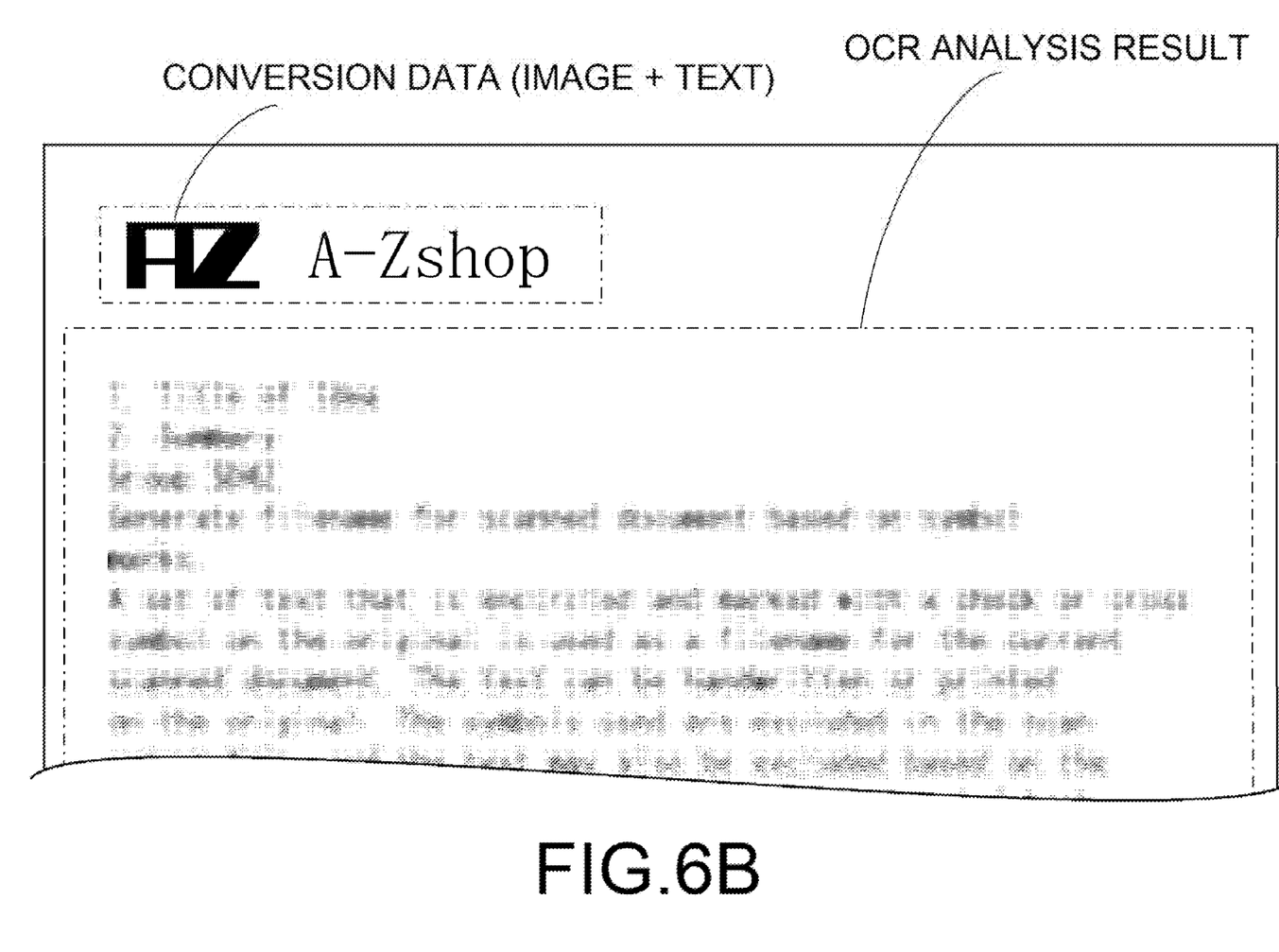
FIG. 6B is a diagram illustrating an example of document data generated by the file generating unit illustrated in FIG. 1.

In the case where the conversion designation information is set to "image+text", the conversion data, the data type of which is "image+text", is specified in step S111. Then, as illustrated in FIG. 6B, the file generating unit 14 generates document data in which the OCR analysis result outputted from the character recognizing unit 12 and the conversion data having the data type "image+text" are combined. In this case, the specific pattern is not included in the image data on which the OCR process is executed, so it is possible to eliminate erroneous detection of a character string of a special shape such as a logo or the like of a company registered as a specific pattern, and it is possible to improve the accuracy of the OCR analysis result. At the same time, it is possible to convert a part of a specific pattern to correct text, and it is possible to easily perform a search using a specific pattern, and furthermore, since a part of a specific pattern is combined as an image, the appearance is also improved.

As described above, according to the present embodiment, there is provided an information processing apparatus 1 that performs an OCR process on image data and converts the image data into document data; and includes: a specific pattern storage unit 40 that stores specific pattern information 41 in which a specific pattern is registered; a pattern comparing unit 11 that compares image data with a specific pattern that is registered in the specific pattern information 41 by image matching and determines whether or not a specific pattern present in the image data is detected, and in the case where a specific pattern is detected in the image data, deletes the specific pattern from the image data and outputs pattern-deleted image data; a character recognizing unit 12 that performs an OCR process on the pattern-deleted image data, converts a character string in the pattern-deleted image data into text data, and outputs the converted text data as an OCR analysis result; and a file generating unit 14 that generates document data based on the OCR analysis result.

With this configuration, a specific pattern is not included in the image data on which the OCR process is executed, so erroneous detection of a character string of a special shape such as a logo or the like of a company registered as a specific pattern is eliminated, and the accuracy of the OCR analysis result can be improved.

Furthermore, in the present embodiment, in the specific pattern information 41, conversion data is registered in association with a specific pattern, a pattern converting unit 13 is provided for converting a specific pattern to conversion data based on the specific pattern information 41, and the file generating unit 14 combines the OCR analysis result and conversion data to generate document data.

With this configuration, it is possible to convert a specific pattern into conversion data registered by the user.

Furthermore, in this embodiment, it is possible to select conversion data in which the data type is text.

With this configuration, it is possible to convert a specific pattern to correct text data, and it is possible to easily perform a search using a specific pattern.

Furthermore, in the present embodiment, a plurality of conversion data having different data types for one specific pattern are registered in the specific pattern information 41, and the pattern converting unit 13 converts into conversion data of a data type designated by the conversion designation information.

With this configuration, conversion data to be converted from a specific pattern can be selected.

Furthermore, in the present embodiment, in the specific pattern information 41, an area of image data to be compared with a specific pattern is registered as a comparison area, and the pattern comparing unit 11 detects a specific pattern existing in the comparison area.

With this configuration, it is possible to shorten the processing time required for comparison of a specific pattern.

Although the character recognition rate by OCR processing is improved, it is still often that a character string of a special shape such as a company logo or the like is erroneously detected. In the case of arranging the OCR analysis result (document data) on the rear side of image data in the file format such as PDF or the like having a layered structure, the erroneously detected character area is not displayed. However, in the case of a file format such as "Word", "Excel", or the like, the erroneously detected character area is displayed, and the erroneously detected character area becomes conspicuous on the output image.

As a typical technique, a technique has been proposed in which it is detected whether a graphic pattern instructed in image data is included, and the display state of image data is changed based on the detection result. Using the above-described typical technique, characters of a special shape such as a company logo or the like can be detected but they cannot be handled as character string data.

According to the present disclosure, since the specific pattern is not included in the image data on which the OCR process is executed, erroneous detection of a character string of a special shape such as a logo or the like of a company registered as a specific pattern is eliminated, and as a result the accuracy of the OCR analysis result can be improved.

It should be noted that the present disclosure is not limited to the above embodiments, and it is apparent that each embodiment can be appropriately changed within the scope of the technical idea of the present disclosure. Moreover, the number, the position, the shape, and the like of the above-described constituent members are not limited to those in the above embodiments, but may be a number, a position, a shape, and the like that are suitable for implementing the present disclosure. Incidentally, in each figure, the same reference numerals are given to the same constituent elements.

What is claimed is:

1. An information processing apparatus that performs an OCR process on image data and converts the image data into document data; comprising:
   a specific pattern storage unit that stores specific pattern information in which a specific pattern is registered;
   a pattern comparing unit that compares the image data with a specific pattern that is registered in the specific pattern information by image matching and determines whether or not the specific pattern present in the image data is detected, and in the case where the specific pattern is detected in the image data, deletes the specific pattern from the image data and outputs pattern-deleted image data;
   a character recognizing unit that performs an OCR process on the pattern-deleted image data, converts a character string in the pattern-deleted image data into text data, and outputs the converted text data as an OCR analysis result; and
   a file generating unit that generates the document data based on the OCR analysis result.

2. The information processing apparatus according to claim 1, wherein
   in the specific pattern information, conversion data is registered in association with a specific pattern;
   a pattern converting unit is provided that converts a specific pattern to conversion data based on the specific pattern information; and
   the file generating unit combines the OCR analysis result and the conversion data to generate document data.

3. The information processing apparatus according to claim 2 wherein
   the conversion data in which the data type is text.

4. The information processing apparatus according to claim 1, wherein
   a plurality of the conversion data having different data types for one specific pattern are registered in the specific pattern information; and
   the pattern converting unit converts into the conversion data of a data type designated by conversion designation information.

5. The information processing apparatus according to claim 1, wherein
   in the specific pattern information, an area of the image data to be compared with the specific pattern is registered as a comparison area; and
   the pattern comparing unit detects the specific pattern existing in the comparison area.

6. The information processing apparatus according to claim 1, wherein the specific pattern comprises a graphic pattern that is not character string data.

\* \* \* \* \*